Aug. 8, 1967  R. W. PAULEY  3,334,487
IMPULSE TOOL WITH IMPROVED CUT-OFF DEVICE
Filed Sept. 7, 1965  8 Sheets-Sheet 1

INVENTOR.
REGINALD W. PAULEY

INVENTOR.
REGINALD W. PAULEY

INVENTOR.
REGINALD W. PAULEY

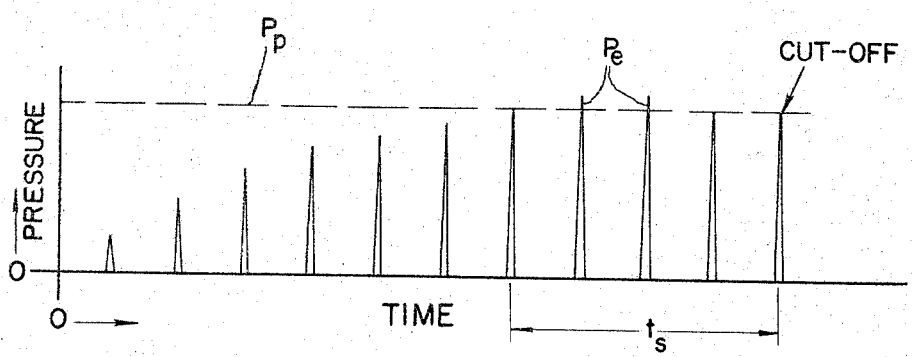
FIG. 4 Flow Restrictor Cut-Off
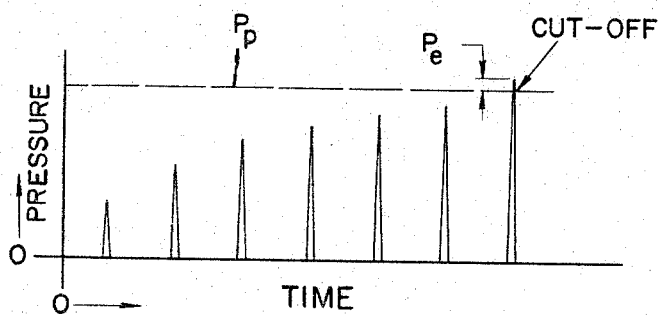
FIG. 5 Direct Operating Cut-Off
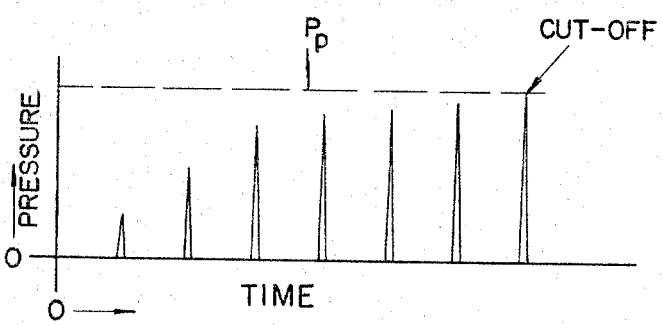
FIG. 6 Direct Operating Cut-Off With Relief Valve

INVENTOR.
REGINALD W. PAULEY

United States Patent Office 3,334,487
Patented Aug. 8, 1967

3,334,487
IMPULSE TOOL WITH IMPROVED
CUT-OFF DEVICE
Reginald W. Pauley, Somerville, N.J., assignor to Ingersoll-Rand Company, New York, N.Y., a corporation of New Jersey
Filed Sept. 7, 1965, Ser. No. 485,312
7 Claims. (Cl. 60—54.5)

This invention relates to impulse tools and more particularly to an improved torque control device or cut-off device for such impulse tools.

Heretofore, impulse tools for applying torque to an object has been of the type disclosed in U.S. Patent No. 3,116,617, issued Jan. 7, 1964, to D. K. Skoog. Impulse tools for supplying fluid impulses to a tool are disclosed and shown in U.S. patent application, Ser. No. 285,160, filed Mar. 18, 1963, by D. K. Skoog, now Patent No. 3,263,426.

Conventional ported bypass devices are shown in:
U.S. Patent No. 2,286,537, June 16, 1942, H. F. Gorsuch; No. 2,814,277, Nov. 26, 1957, F. A. Jimerson; No. 2,903,003, Sept. 8, 1959, C. M. Walton; No. 3,060,895, Oct. 30, 1962, W. F. Acker et al.

The defects of conventional cut-off devices of the type shown in the above-mentioned U.S. Patent No. 3,116,617 are that:

(1) the device is not directly actuated by the high pressure portion of the cavity,
(2) the device does not cut off with the first impulse which exceeds the maximum setting of the device,
(3) the device requires exact calibration of the restrictive orfice to insure satisfactory operation,
(4) the device is complicated with a large number of moving parts.

It is the general object of the present invention to avoid and overcome the foregoing and other difficulties of and objections to prior art practices by the provision of an improved cut-off device for an impulse tool which cut-off device:

(1) is directly actuated by the high pressure portion of the cavity;
(2) shuts off the drive means of the impulse tool when the predetermined torque is reached;
(3) eliminates the restrictive orifice; and
(4) is simplified thereby reducing the number of moving parts.

The aforesaid objects of the present invention, and other objects which will become apparent as the description proceeds, are achieved by providing an improved cut-off device for an impulse tool which impulse tool is used for applying a torque to an object and/or for supplying fluid impulses for operating a tool. The impulse tool has housing means provided with a cavity for sealingly containing a fluid, spindle means in the housing means and in the fluid and drive means operatively associated with one of the housing means and the spindle means for causing relative rotary movement between the housing means and the spindle means. Sealing means are on one of the housing means and the spindle means. A first sealing portion is on said housing means and a second sealing portion is on said spindle means. The first sealing portion and the second sealing portion are in sealing relation during a relatively small portion of each revolution of the relative rotative movement. The first sealing portion and the second sealing portion and the sealing means are operable during a relatively small portion of each revolution of the relative rotary movement to dynamically seal off the cavity into a high pressure portion and a low pressure portion to produce a primary pressure pulse in the high pressure portion and on the other of the housing means and the spindle means thereby causing the other to rotate with respect to the one of the housing means and the spindle means and to apply a torque to the object.

The cut-off device is disposed in one of the housing means and the spindle means. Such one is provided with cavity means in communication with the high pressure portion. Power supply means are connected to the drive means. Switch means are in the power supply means. Piston means are in the cavity means and are engageable with the switch means. The piston means are responsive to a predetermined pressure in the high pressure portion to operate the switch means and shut off the power supply means.

For a better understanding of the present invention, reference should be had to the accompanying drawings wherein like numerals of reference indicate similar parts throughout the several views and wherein:

FIG. 4 is a graph of pressure against time in the high pressure portion of an impulse tool to illustrate the operation of a conventional cut-off device therefor;

FIG. 5 is a graph similar to FIG. 4 to illustrate the operation of a cut-off device made in accordance with the present invention;

FIG. 6 is a graph similar to FIGS. 3 and 4 to illustrate the operation of the cut-off device with a relief valve means to eliminate an excess pressure differential;

Although the principles of the present invention are broadly applicable to impulse tools, the present invention is particularly adapted for use in conjunction with impulse tools driven by air or electric motors and hence it has been so illustrated and will be so described.

Figure 1:
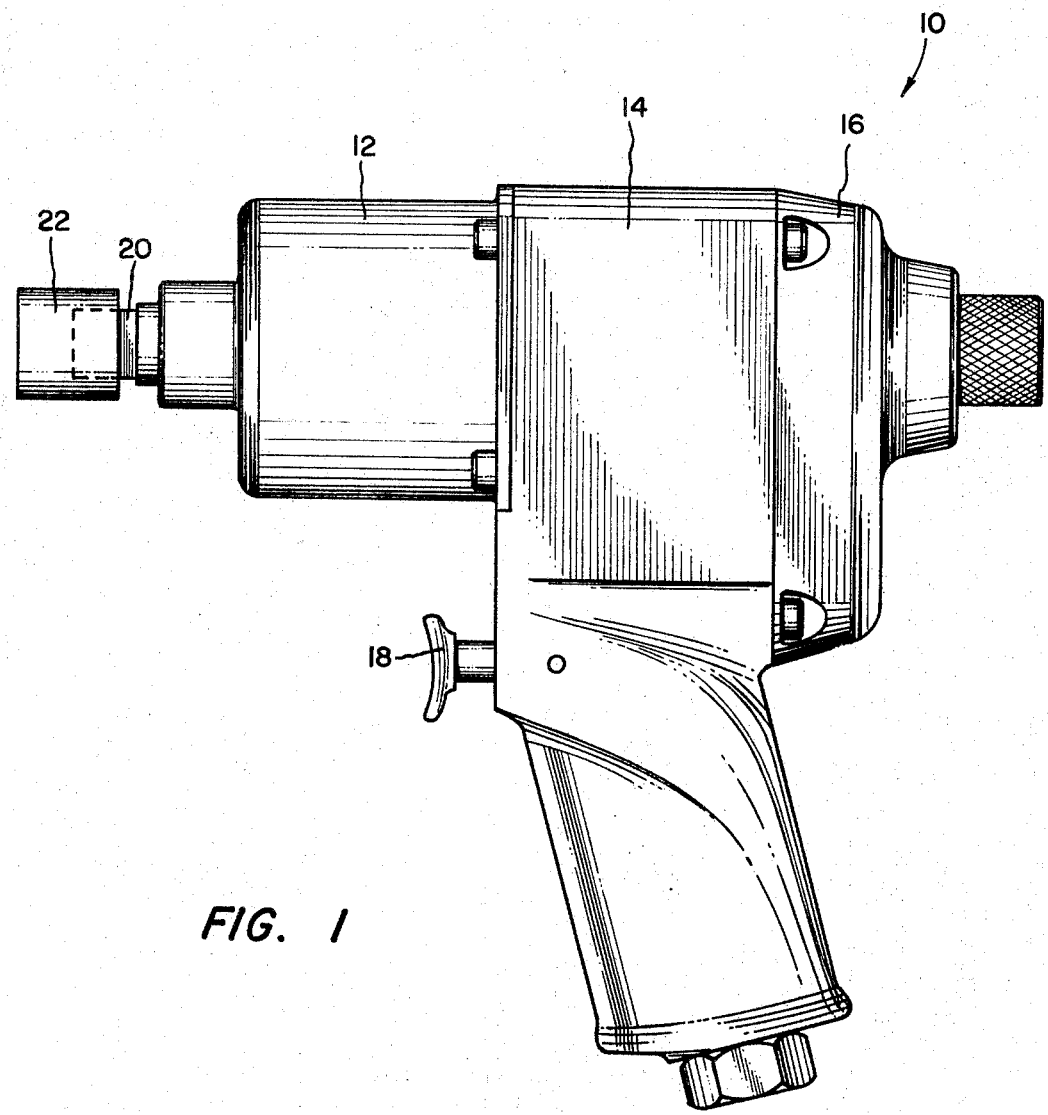
FIG. 1 is a side elevational view of the impulse tool incorporating the improved cut-off device of the present invention.
Figure 2:
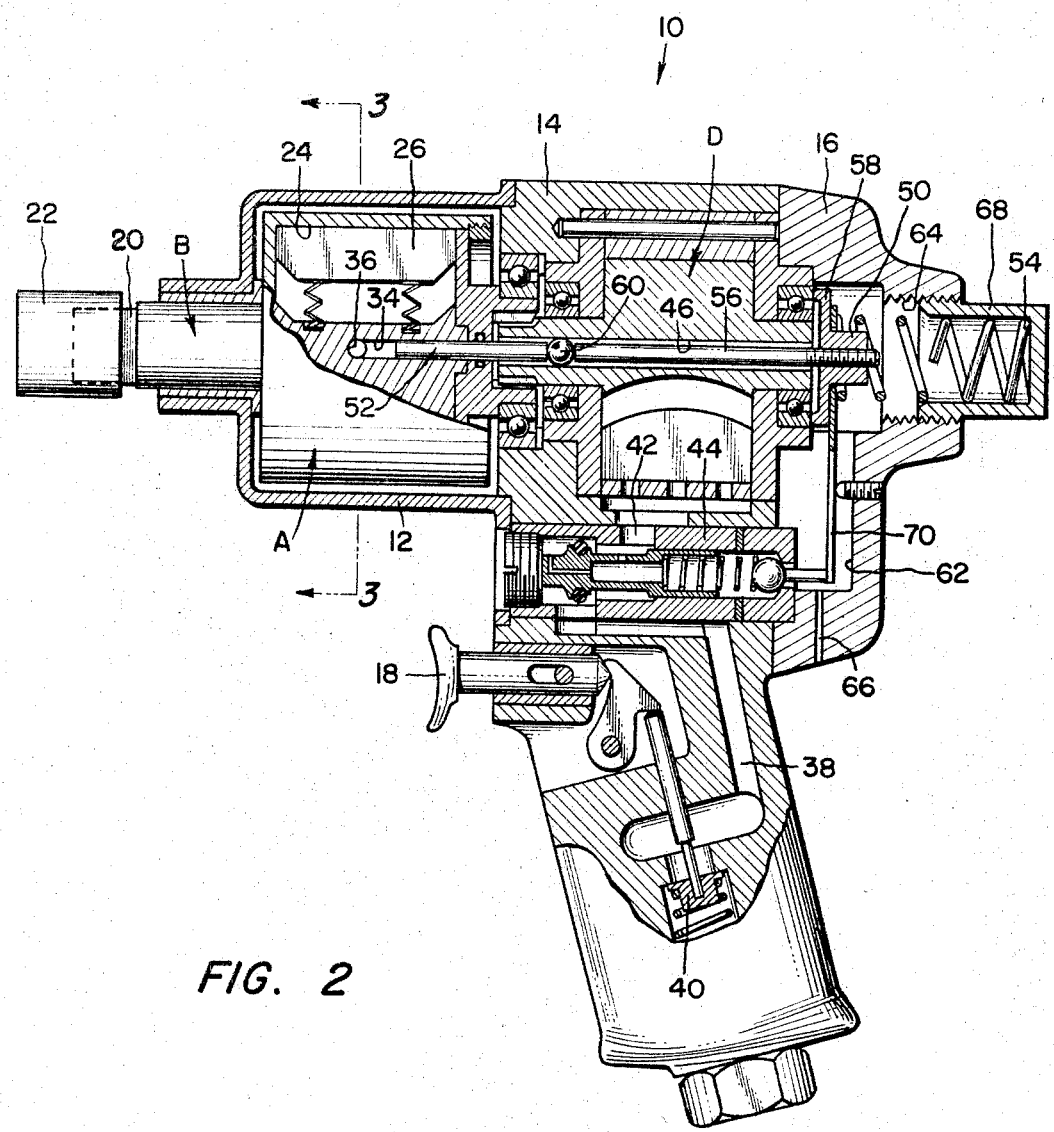
FIG. 2 is a vertical sectional view of the tool shown in FIG. 1.
Figure 3:
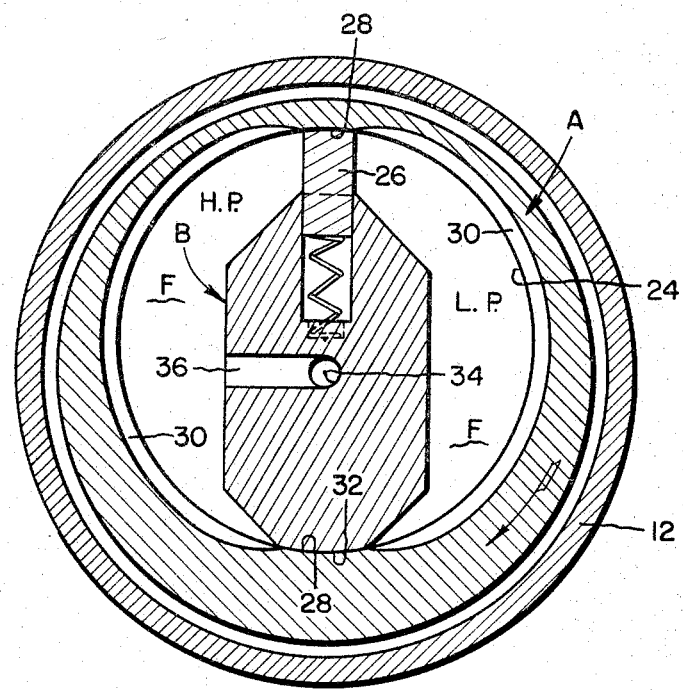
FIG. 3 is a sectional view taken along the line 3—3 of FIG. 2.

With specific reference to the form of the present invention illustrated in the drawings, and referring particularly to FIGS. 1, 2, and 3, an impulse tool is indicated generally by the reference numeral 10.

As shown in FIG. 1, the impulse tool 10 has an impulse tool casing 12, motor casing 14, and cut-off device casing 16. A trigger 18 is provided for actuating the impulse tool 10, and a spindle shaft 20 projects from the impulse tool casing 12 and carries a socket 22.

Figure 11:
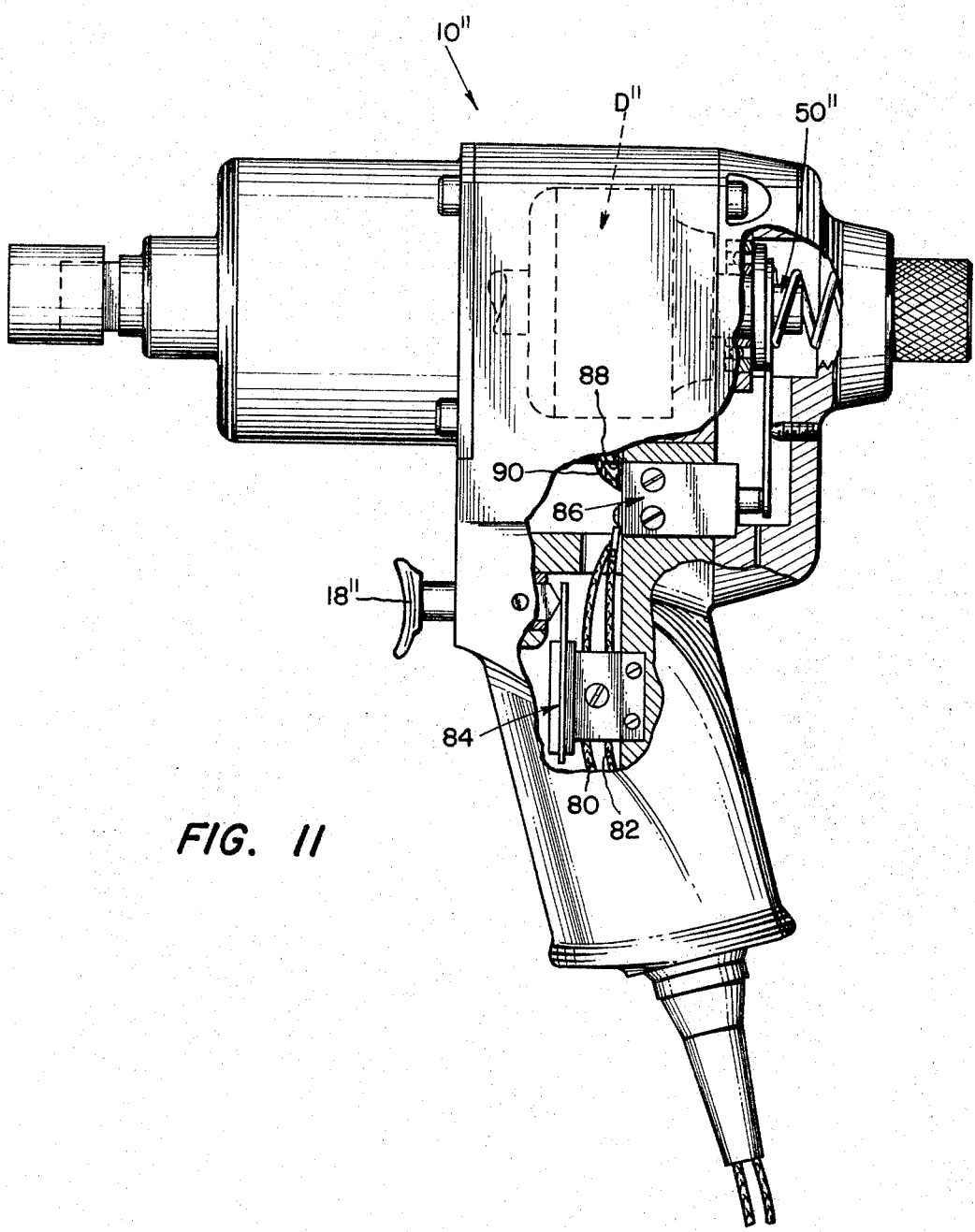
FIG. 11 is a view similar to FIG. 1 with a portion of the outer case broken away to illustrate an electric motor as the drive means.

Referring now to FIGS. 2 and 3, the impulse tool 10 has housing means A provided with a cavity 24 (FIG. 3) for sealingly containing a fluid, such as oil F, spindle means B in the housing means A and in the oil F, and drive means, such as an air motor D or an electric motor as shown in FIG. 11, associated operatively with one of the housing means A and spindle means B (in this case the housing means A), for causing relative rotary movement between the housing means A and the spindle means B. The other of the housing means A and the spindle means B (in this case the spindle means B) carries the socket 22.

Sealing means, such as the spindle blade 26, are carried by one of the housing means A and spindle means B (i.e., the spindle means B in FIGS. 2 and 3).

A first sealing portion, such as a pair of lands 28 (FIG. 3), are between undercuts 30 in a cavity 24 of the housing means A. A second sealing portion, such as the shank portion 32 of the spindle means B, is provided.

The lands 28, spindle blade 26, and shank portion 32 are in sealing relation during a relatively small portion of each revolution of the relative rotative movement between housing means A and spindle means B and are operable during this relatively small portion of each revolution of the relative rotary movement to dynamically seal off the cavity 24 into a high pressure portion HP (FIG. 3) and a low pressure portion LP to produce a primary pressure pulse in the high pressure portion HP and on the other of the housing means A and the spindle means B (in this case the spindle means B) thereby causing the spindle means B to tend to rotate, momentarily, in unity with the housing means A.

It will be understood by those skilled in the art that a conventional impulse wrench of the type shown in U.S. Patent No. 3,116,617, requires a cut-off time $t_s$ in seconds after a predetermined pressure $P_p$ is reached to shut off the impulse tool, as graphically illustrated in FIG. 4. For the purpose of reducing the cut-off time $t_s$ of FIG. 4 to substantially zero, an improved cut-off device CD made in accordance with the present invention is employed.

Cut-off device

As shown in FIGS. 2 and 3, the cut-off device CD is disposed in one of the housing means A and the spindle means B, in this instance the spindle means B. The spindle means B is provided with cavity means, such as an axial bore or chamber 34, in communication with the high pressure portion HP of cavity 24 by means of a passage 36.

As shown in FIG. 2, power supply means (not shown) is connected to an inlet control or throttle valve 40 and supplies air to motor D when trigger 18 is depressed to open valve 40, through inlet passage means 38, across a cut-off or switch means, such as a ball-type unloader valve 44, and through passage 42.

Piston means 50 is provided to actuate valve 44 in response to high pressure for unloading the inlet air to cut-off motor D. This is accomplished by a piston 52 slidably disposed in chamber 34 which extends into a bore 46, through the rotor RD of motor D, axially aligned with chamber 34. Piston 52 is biased toward passage 36 (toward the left in FIG. 2) by a spring 54 through a follower piston 56 slidable in bore 46. One end piston 56 has a head 58 providing a seat for spring 54, and the other end drives piston 52 through a ball 60.

Casing 16 has a chamber 62 with a threaded access opening 64 axially aligned with follower piston 56, and a vent passage 66. A threaded member 68 is provided to close opening 64 and provide a seat for the other end of spring 54. Member 68 is threadedly positionable to adjust the force of spring 54 to control or determine cut-off pressure which actuates the piston means 50. Similarly, head 58 of follower piston 56 is threadedly positionable to axially position piston 52 in chamber 34. An actuating member 70, disposed in chamber 62 is operatively associated at its ends with follower piston 56 and valve 44, and is pivoted at a point intermediate its ends.

Thus, when the predetermined cut-off pressure $P_p$ is present in chamber 34, piston 52 moves against the bias of spring 54 causing follower piston 56 to move and member 70 to pivot which actuates valve 44 for venting passages 38 and 42 through chamber 62 and its vent 66.

Alternative embodiments

Figure 7:
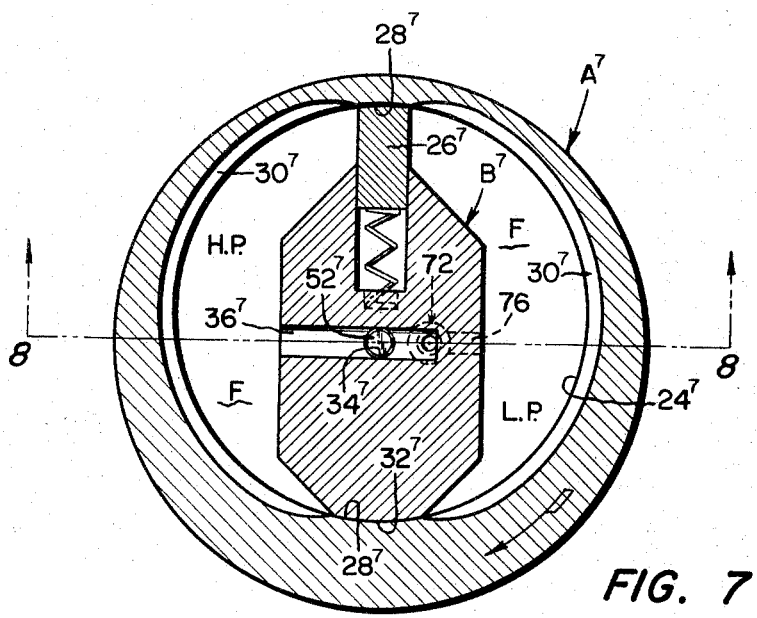
FIG. 7 is a view similar to FIG. 3 illustrating an alternative embodiment of a relief valve in parallel with the cut-off device.
Figure 8:
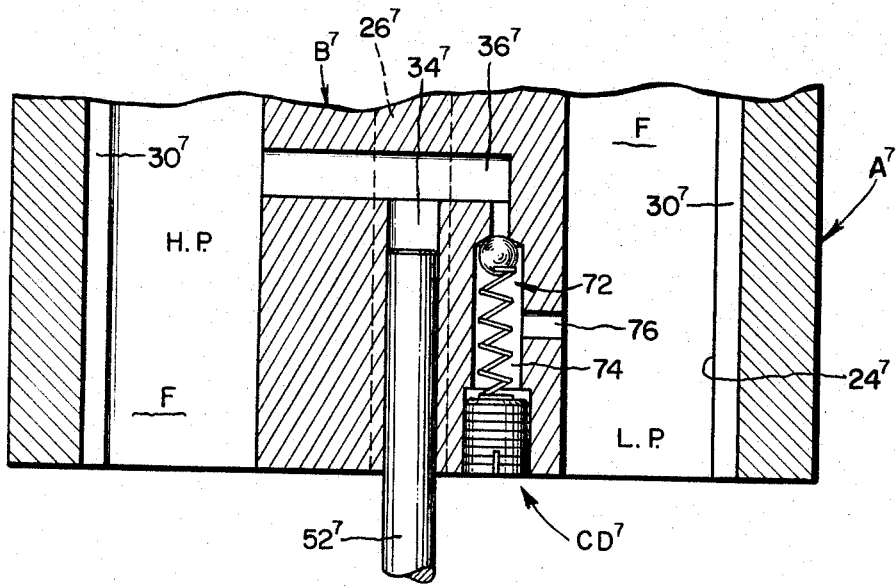
FIG. 8 is an enlarged fragmentary sectional view taken along the line 8—8 of FIG. 7.

It will be understood by those skilled in the art that alternatively, as shown in FIGS. 7 and 8, the cut-off device $CD_7$ is employed to eliminate the excess pressure $P_e$ of the graph of FIG. 5 in the pressure pulse at predetermined pressure $P_p$, as graphically illustrated in FIG. 6. Here, a pressure relief valve 72, disposed in passage 74 in parallel with the chamber $34^7$, is normally closed to passage 36 and communicates with the low pressure portion LP of cavity $24^7$ through passage 76. To bleed off the excess pressure $P_e$ (FIG. 5) in the high pressure portion HP of cavity $24^7$, valve 72 opens and provides communication between passages $36^7$ and 76.

Figure 9:
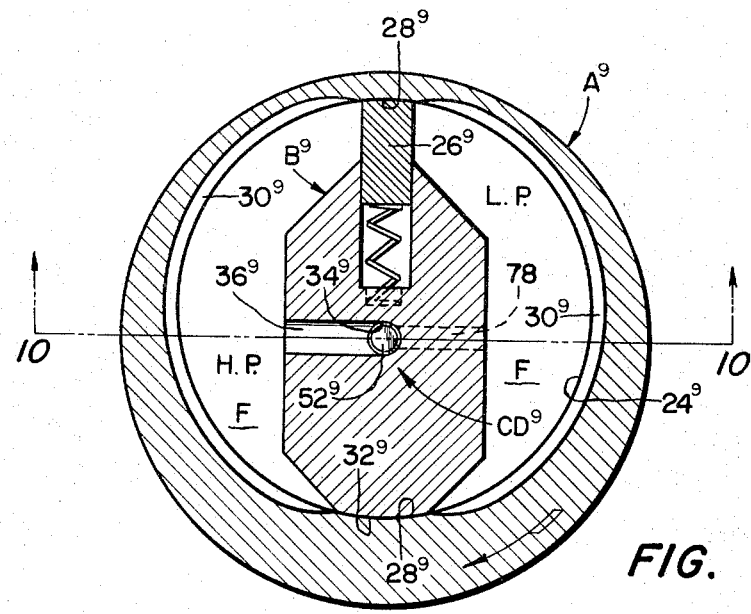
FIGS. 9 and 10 are views similar to FIGS. 7 and 8, respectively, illustrating the cut-off device operable to provide pressure relief.
Figure 10:
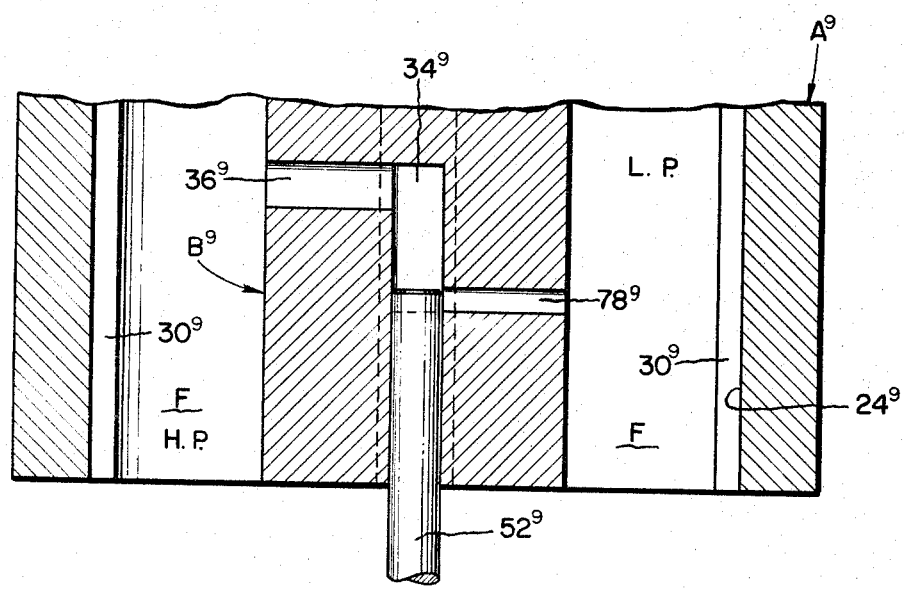

Referring to FIGS. 9 and 10, the piston $52^9$ achieves the same result as the embodiment in FIGS. 7 and 8 when such piston $52^9$ moves from the solid-line position in FIG. 10 to the dotted-line position in FIG. 10 thereby permitting fluid flow off of oil F from chamber $34^9$ through passage $78^9$ to low pressure portion LP of cavity $24^9$.

In FIG. 11, a modified tool $10^{11}$ has drive means which is an electric motor $D^{11}$ having power supply means comprising lines 80 and 82; starting or control switch 84, actuated by trigger $18^{11}$; and a cut-off switch 86, actuated by piston means $50^{11}$ at predetermined pressure $P_p$ (FIG. 5); and lines 88 and 90 leading to the electric motor $D^{11}$.

Figure 12:
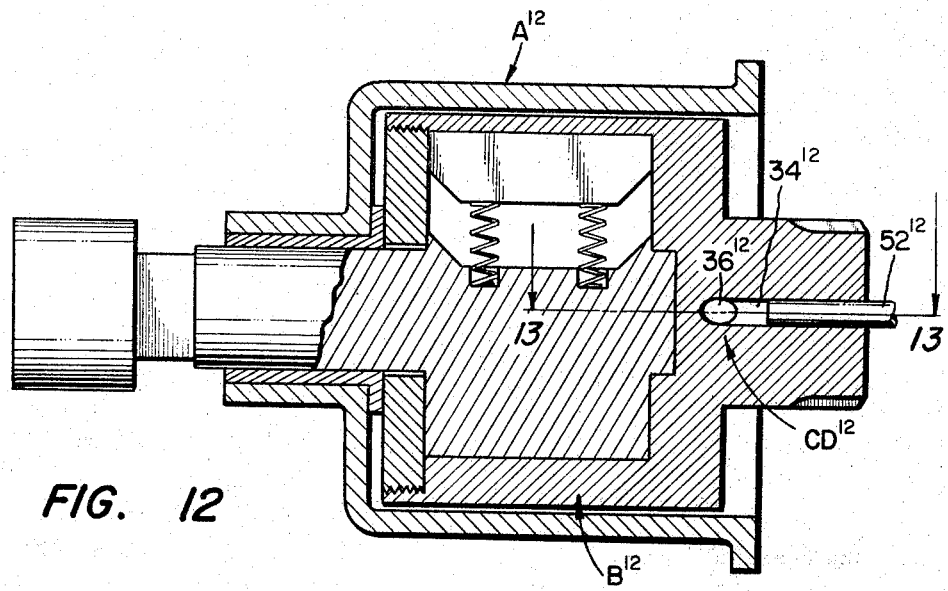
FIG. 12 is a vertical sectional view similar to a portion of FIG. 2 to illustrate the novel cut-off device in the housing means.
Figure 13:
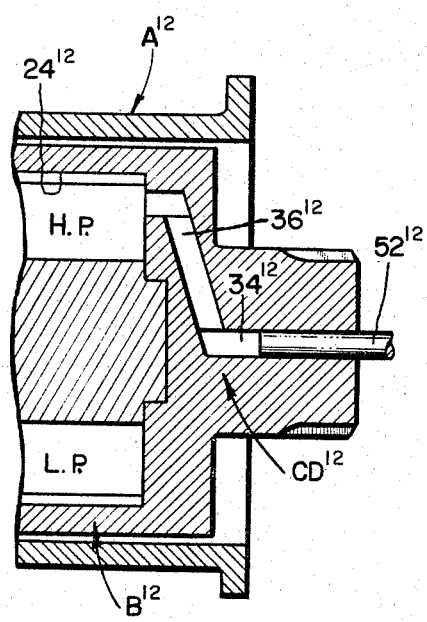
FIG. 13 is a sectional view along the line 13—13 of FIG. 12.

In FIGS. 12 and 13, the cut-off device $CD^{12}$ is disposed in the housing means $A^{12}$. As shown, chamber $34^{12}$ is axially disposed in housing means $A^{12}$ and is connected to the high pressure portion of cavity $24^{12}$ by a passage $36^{12}$.

It will be recognized by those skilled in the art that the objects of the present invention have been achieved by providing an improved cut-off device for an impulse tool which cut-off device:

(1) is directly actuated by the high pressure portion of the cavity;
(2) shuts off the drive means of the impulse tool when the predetermined torque is reached;
(3) eliminates the restrictive orifice; and
(4) is simplified thereby reducing the number of moving parts.

While in accordance with the patent statutes a preferred embodiment and alternative embodiments thereof of the present invention have been illustrated and described in detail, it is to be particularly understood that the invention is not limited thereto or thereby.

I claim:
1. For an impulse tool having housing means provided with a cavity for sealingly containing a fluid, spindle means in said housing means and in said fluid, drive means operatively associated with one of said housing means and said spindle means for causing relative rotary movement between said housing means and said spindle means, sealing means on one of said housing means and said spindle means, a first sealing portion on said housing means, a second sealing portion on said spindle means, said first sealing portion and said second sealing portion being in sealing relation during a relatively small portion of each revolution of said relative rotative movement, said first sealing portion and said second sealing portion and said sealing means being operable during said relatively small portion of each revolution of said relative rotary movement to dynamically seal off said cavity into a high pressure portion and a low pressure portion to produce a primary pressure pulse in said high pressure portion and on said other of said housing means and said spindle means thereby causing said other to rotate with respect to said one of said housing means and said spindle means, a cut-off device in one of said housing means and said spindle means, said cut-off device comprising:

(a) said one housing being provided with cavity means in communication with said high pressure portion,
(b) power supply means connected to said drive means,
(c) switch means in said power supply means,
(d) piston means in said cavity means and engageable with said switch means, and
(e) said piston means being responsive to the predetermined pressure in said high pressure portion to operate said switch means and shut off said power supply means.

2. The cut-off device recited in claim 1 being in said housing means.

3. The cut-off device recited in claim 1 being in said spindle means.

4. The cut-off device recited in claim 1 wherein said drive means is an air motor.

5. The cut-off device recited in claim 1 wherein said drive means is an electric motor.

6. The cut-off device recited in claim 1 wherein said switch means is an air valve.

7. The cut-off device recited in claim 1 wherein said switch means is an electric switch.

References Cited

UNITED STATES PATENTS

| | | | |
|---|---|---|---|
| 2,903,003 | 9/1959 | Walton | 137—33 |
| 3,116,617 | 1/1964 | Skoog | 64—26 |
| 3,214,940 | 11/1965 | Kramer | 64—26 |
| 3,214,941 | 11/1965 | Shulters | 64—26 |

EDGAR W. GEOGHEGAN, *Primary Examiner.*

R. R. BUNEVICH, *Assistant Examiner.*